United States Patent [19]
Rudle

[11] 3,756,198
[45] Sept. 4, 1973

[54] PULSATOR FOR MILKING MACHINES

[75] Inventor: August Rudle, Stuttgart-Bad Cannstatt am Romerkastell, Germany

[73] Assignee: Bizerba-Werke Wilhelm Kraut AG, Balingen/Wurttemberg, Germany

[22] Filed: Aug. 11, 1971

[21] Appl. No.: 170,689

[30] Foreign Application Priority Data
Aug. 14, 1970 Germany.................. P 20 40 520.3

[52] U.S. Cl............................ 119/14.36, 119/14.37
[51] Int. Cl............................................... A01j 5/04
[58] Field of Search...................... 119/14.36, 14.37, 119/14.55

[56] References Cited
UNITED STATES PATENTS
1,195,996   8/1916   Leitch............................... 119/14.3
3,125,067   3/1964   Fosnes.............................. 119/14.55
3,302,614   2/1967   Karnath............................ 119/14.36

*Primary Examiner*—Hugh R. Chamblee
*Attorney*—Arnold B. Christen and Eugene Sabol

[57] ABSTRACT

A milking machine pulsator of the type wherein milk moves from a teat cup, through a milk collecting chamber in the pulsator, to a storage container under the influence of a vacuum, and a valve opens and closes a connection between the chamber and storage container under the influence of a vacuum-pressure source controlled reciprocating valve, a throttled connection being provided between the milk collecting chamber and the atmosphere so that vacuum and pressure lines for the reciprocating valve can be isolated from the milk conveying lines.

7 Claims, 3 Drawing Figures

PULSATOR FOR MILKING MACHINES

The invention relates to a pulsator for milking machine, having a control piston valve which is reciprocatingly driven and a milk collecting chamber which is periodically connected to a milk collecting line maintained under vacuum, wherein a valve body is located in the milk collecting chamber and is carried by a flexible membrane to periodically close the milk collecting line, this membrane being alternatingly subjected to vacuum and pressure by the control piston valve.

In known pulsators of this type (German Utility Model No. 1.997.538) the milk collecting chamber is periodically connected to the atmosphere through the control piston valve, while the milk collecting line is simultaneously closed. Thereby it is possible for residues to penetrate into the control device and thicken therein, thus inhibiting the accurate functioning of the control piston valve. In addition, lubricants used in the control device may also reach the milk conducting portions of the pulsator, which, of course, is undesirable for sanitary reasons.

The object of the invention is, therefore, to overcome these drawbacks and to avoid the entry of the milk into the control device, on one hand, and a flow of lubricants from the control device into the milk, on the other hand.

This object can be realized, according to the invention, by completely isolating the milk conducting portions of the pulsator from the control system. In a preferred embodiment of the invention this separation is achieved by the fact that the milk collecting chamber is in communication with the atmosphere only through a throttle. In another embodiment of the invention a separate pipe can be provided which connects the milk collecting chamber to the atmosphere by means of a valve which is independent from the control system.

Other objects and advantages of the invention will be apparent from the following description in connection with the attached drawings, in which.

Figure 1:
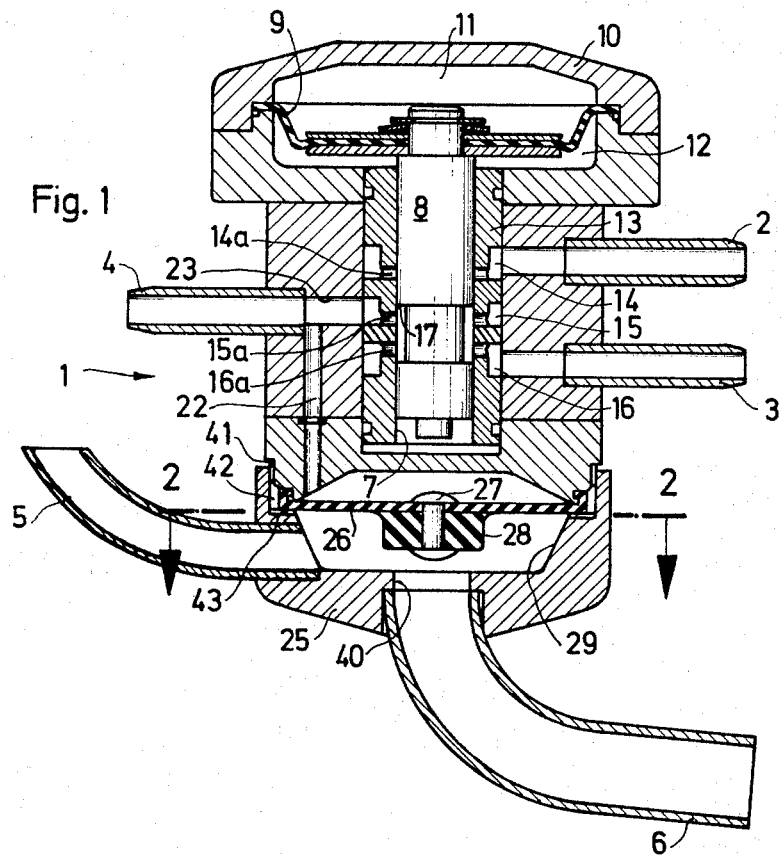
FIG. 1 is a vertical sectional view of a pulsator according to the invention.

FIG. 1 shows a pulsator for milking machines, according to the invention, which comprises a multi-part housing 1 provided with a plurality of hose nipples 2, 3, 4, 5 and 6. During operation of the pulsator the hose nipple 2 is permanently connected to a source of pressurized air while the hose nipple 3 is permanently connected to a vacuum line. The two hose nipples 4 and 5 are connected to respective lines which lead to the usual teat cup which is to be applied to the udder of an animal to be milked. The withdrawn milk is led away through the hose nipple 5. The hose nipple 6 acts as milk collecting line and leads to a milk collecting vessel (not shown) via an interconnected hose or a similar duct.

A control device is located in housing 1 of the pulsator. This device includes a control piston valve 8 which is reciprocatingly driven in a centrally located bore 7. Piston valve 8 is fixedly connected at its upper end to a flexible membrane 9 which divides a space, formed by a cover 10 in the upper part of housing 1, into two chambers 11 and 12. These chambers are alternatingly subjected to pressure and vacuum by means which are well known in the art as described in my prior U.S. Pat. No. 3,610,266, granted Oct. 5, 1971, so that the control piston valve 8 is reciprocated vertically by the membrane 9. FIG. 1 shows the control piston valve in its lower position.

The bore 7 is defined by a bushing 13 which is part of the control device and which is fitted into a bore provided in housing 1. The bushing 13 is provided on its outer surface with three annular grooves 14, 15, 16, of which the grooves 14 and 16 are connected to the hose nipples 2 and 3, respectively. The ring groove 15 is connected to the hose nipple 4. In addition, all the grooves 14, 15 and 16 communicate with the bore 7 by means of radially arranged ports 14a, 15a and 16a, respectively. The control piston valve 8 is provided with an annular control groove 17, such that in the upper position (not shown) of the piston valve the two annular grooves 14 and 15 communicate with each other through the groove 17, whereas in the lower position (FIG. 1) of the piston valve the two grooves 15 and 16 are in communication with each other. In addition, housing 1 is provided with a channel 22 extending substantially parallel to the direction of movement of the control piston valve 8, commencing at a transverse bore 23 connected to the hose nipple 4 and ending at the dished under surface of housing 1.

A bottom enclosure 25 is detachably secured to the under surface of housing 1 by means of clamps (not shown) and is provided with the hose nipples 5 and 6. A flexible impermeable membrane 26 is fixedly clamped between bottom part 25 and housing 1 and an elastic valve body 28 is secured thereto, for example by means of a rivet 27, or may be molded integrally with the membrane. The valve body 28 serves the purpose of closing the opening 40 of the milk collecting line 6. The valve body 28, made for example of rubber, closes the opening 40 tightly even if no special valve seat is provided on the latter.

Figure 2:
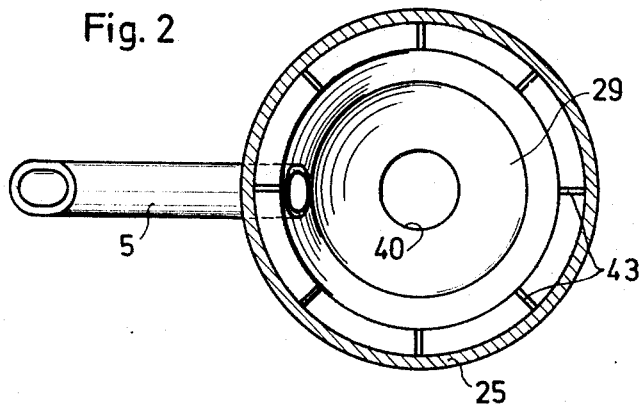
FIG. 2 is a sectional view of the pulsator, along line 2—2 in FIG. 1.

As it can be seen in FIG. 1, relatively narrow gutter-like channels 41 which extend longitudinally of the housing 1 are provided around the lower margin of the housing and lead into an annular space 42 located between the housing 1 and the bottom part 25. The annular space 42 communicates with the milk collecting chamber 29 by means of additional narrow radial channels 43 which are located on a horizontal surface of the bottom part 25 (FIG. 2). Thus, the milk collecting chamber 29 is always in communication with the atmosphere through the channels 41, 43 and the annular space 42. However, the channels 41 and/or 43 are so narrow that they act as throttles and only permit a delayed pressure compensation between the atmosphere and the milk collecting chamber 29.

The effect of these channels 41 and 43 is that, in contrast to other embodiments of milking machine-pulsators, the milk conveying parts of the pulsator, that is, the hose nipple 5, the milk collecting chamber 29 and the milk collecting line 6, are completely isolated from the control piston valve 8 of the control device, since the necessary communication of the milk collecting chamber 29 with the atmosphere is not established through the control piston valve 8. Thus, in the pulsator of the invention the milk cannot reach the control device nor can the lubricant flow from the control device into the milk.

During the milking process the pulsator according to the invention operates as follows: The control piston valve 8 is pulsatoryly driven by the membrane 9 which is controlled by pressurized air. In its upper (not shown) position it connects the hose nipple 2 which is subjected to pressurized air with the hose nipple 4 through the annular groove 14, the groove 17 and the groove 15. The pressure built up in the transverse bore 23 which is connected to the hose nipple 4 extends through channel 22 into the space above membrane 26 and presses this membrane downwards, so that the valve body 28 hermetically closes the opening 40 of the milk collecting line 6 in the milk collecting chamber 29. Simultaneously, the milk collecting chamber 29 is connected with the atmosphere through the channels 41, 43 and the annular space 42.

In the lower end position of the control piston (FIG. 1) the groove 17 connects the two annular grooves 16 and 15 with each other. Since the groove 16 is connected to a vacuum line through the hose nipple 3, a vacuum is also produced in the space located above membrane 26, through channel 22 and transverse bore 23, so that the membrane 26, because of its elasticity, lifts up the valve body 28 from the opening of the milk collecting line 6. In this working phase the milk collecting chamber 29 remains in communication with the atmosphere through channels 41 and 43. However, since these channels act as throttles, the outside air can only slowly penetrate into the milk collecting chamber 29 and does not substantially reduce the vacuum exerted through the milk collecting line 6. Under the effect of the vacuum existing in the milk collecting line the milk is sucked into the milk collecting chamber 29, through the hose nipple 5, and further into the collecting vessel connected to the collecting line 6.

Figure 3:
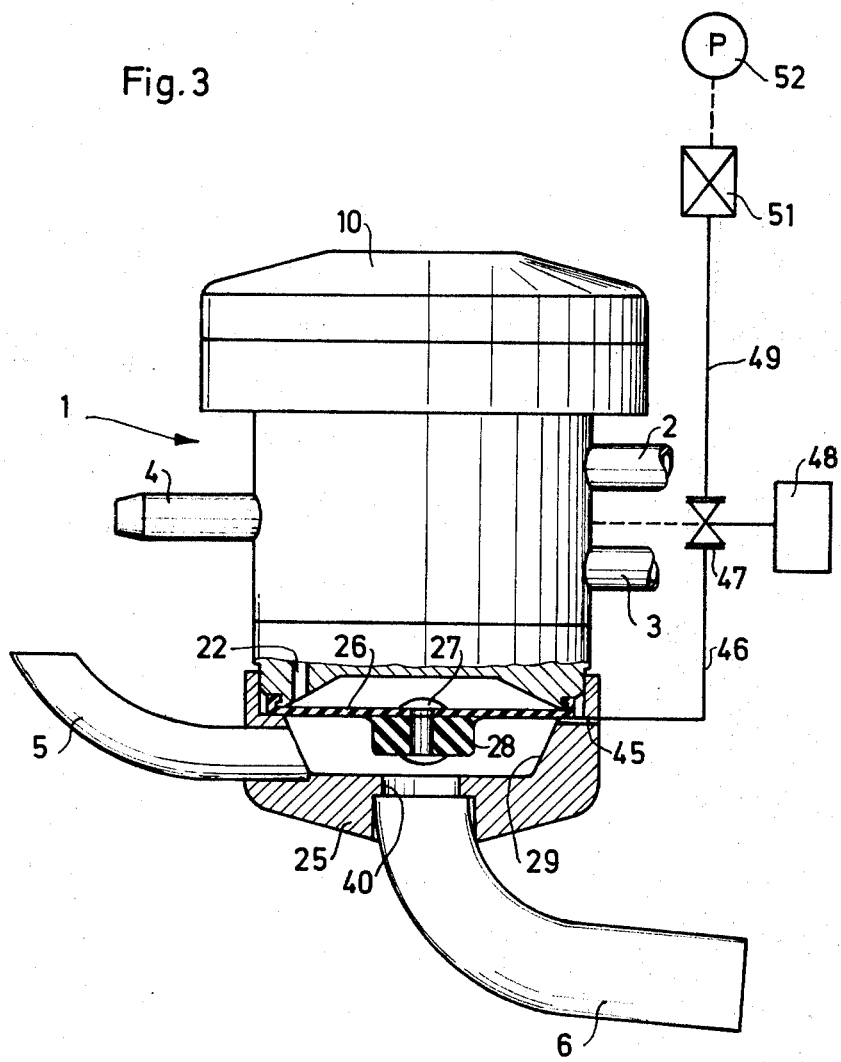
FIG. 3 shows another embodiment of the invention, in a partially schematical form.

FIG. 3 shows a further embodiment of the invention, in which the milk collecting chamber 29 is also completely isolated from the control device. In this case the bottom part 25 of the pulsator is provided with a radial bore 45 entering the milk collecting chamber 29, which is connected by a pipe 46 to a valve 47. Due to hygienic reasons the valve 47 is preferably a membrane valve. The opening and closing of valve 47 is positively controlled by an actuating device 48 and is in communication with the atmosphere through a line 49 and an air filter 51. In the position of the membrane 26, which is shown in FIG. 3, the actuating device 48 keeps the valve 47 closed. Thus, in that position the milk collecting chamber 29 is cut off from the atmosphere. When the valve body 28, which is secured to the membrane 26, closes the opening 40 of the milk collecting line 6, under the effect of the control piston valve 8, the device 48 opens the valve 47, so that now the milk collecting chamber 29 will be connected to the atmosphere through lines 46 and 49, and the air filter 51 prevents dirt particles from entering into the system. In case the air filter 51 produces a pressure drop which is too high with respect to the operation of the pulsator, a pressure source 52 can be coupled to the air filter, as indicated by dotted lines in FIG. 3.

Furthermore, an air filter can also be coupled to the throttles 41, 43 described with relation to the embodiment of FIGS. 1 and 2 in order to also prevent dirt particles from entering into the system.

In the embodiment of FIG. 3 the valve 47 is controlled by a separate actuating device 48. This device can be omitted if the valve 47 is directly controlled by the control piston valve 8, provided that the control piston valve 8 is correspondingly modified to provide suitable control channels. In this case, the construction of valve 47 as a membrane valve is particularly advantageous, for sanitary reasons.

Other modifications and improvements may be made by those skilled in the art which would come within the scope of the annexed claims.

I claim:

1. In a pulsator for milking machines, comprising a housing, a control system including reciprocating pneumatically operated control piston means contained in said housing, a milk conveying system including a milk collecting chamber contained in said housing, said milk conveying system including an inlet to be collected with a teat cup and a milk collecting line maintained under vacuum and communicating with said milk collecting chamber said chamber also being provided with a throttled opening in communication with the atmosphere, said control system and said milk conveying system being isolated from each other by means of a flexible impermeable membrane in said housing and common to both systems, one surface of said membrane defining a portion of the wall of the milk collecting chamber, and a valve body secured to said membrane and movable therewith to open and close said milk collecting line in response to the reciprocating movement of said control piston means, whereby contamination of the milk by the lubricant of the reciprocating control piston means is prevented.

2. The invention as defined in claim 1, wherein said milk collecting chamber inlcudes pipe means and valve means for communication with the atmosphere.

3. The invention as defined in claim 2, wherein said valve means is independent of said control system.

4. The invention as defined in claim 2, wherein said control piston means of the pulsator includes means for actuating said valve means.

5. The invention as defined in claim 3, wherein said valve means is a membrane valve.

6. The invention as defined in claim 5, wherein said pipe means includes an air filter.

7. The invention as defined in claim 6, wherein said pipe means includes a pressure source coupled to the air filter to compensate for the pressure drop produced by the air filter.

* * * * *